F. DEBROSKY.
LAMP.
APPLICATION FILED FEB. 17, 1916.
1,205,864.
Patented Nov. 21, 1916.
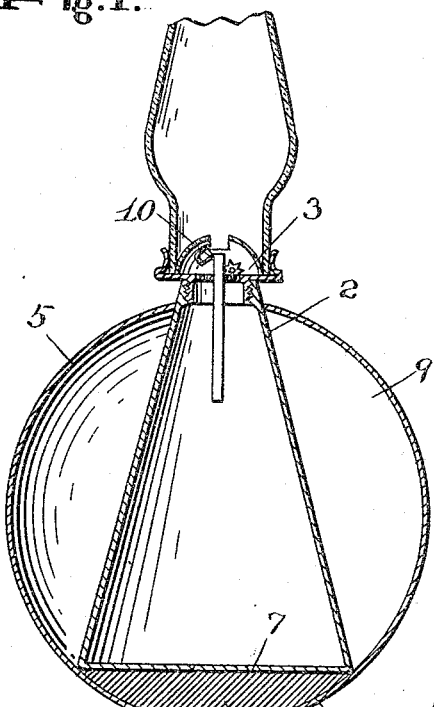
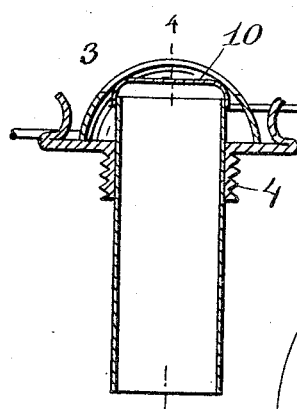
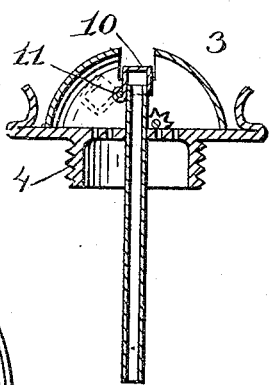
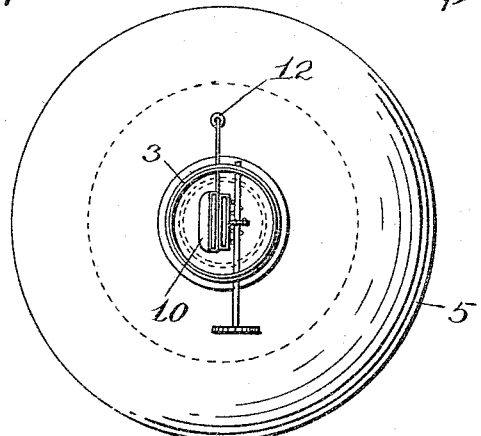
Witness
Stuart Wilder.
Inventor
Frank Debrosky,
E. W. Anderson
his Attorney

UNITED STATES PATENT OFFICE.

FRANK DEBROSKY, OF ADAMS, MASSACHUSETTS.

LAMP.

1,205,864.  Specification of Letters Patent.  Patented Nov. 21, 1916.

Application filed February 17, 1916. Serial No. 78,863.

*To all whom it may concern:*

Be it known that I, FRANK DEBROSKY, a citizen of the United State, resident of Adams, in the county of Berkshire and State of Massachusetts, have made a certain new and useful Invention in Lamps; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a central vertical section of the invention. Fig. 2 is a plan view of the same. Fig. 3 is a detail sectional view of the burner, showing the cap closing the top of the wick tube. Fig. 4 is a section on the line 4—4 Fig. 3.

The invention has relation to portable lamps for domestic use, having for its object to provide an improved means to eliminate danger of explosion.

In the accompanying drawings, illustrating the invention, the numeral 2 designates the oil receptacle, of frusto-conical form, fitting within a hollow spherical casing 5, the enlarged bottom of the receptacle being marginally in contact with the inner wall of the casing and located adjacent to and spaced apart from the bottom 7 of the casing, and the contracted top of the receptacle fitting within a top opening of the casing, the burner 3 engaging said top of the receptacle, usually by means of a screw thread 4. The upwardly and inwardly extending side walls of the receptacle are spaced apart from the side walls of the casing by an annular interval 9, of the form of a minor segment of a circle in cross-section. A circular weight 8 is located in the space 6' between the bottoms of the receptacle and of the casing. The contracted upper end of the receptacle engages a top opening of the casing, and the enlarged bottom of the receptacle is in contact with the lower portion of the inner wall of the casing. This lamp receptacle and casing, so connected together, are in such stable equilibrium that they can be tilted even at right angles and will still resume upright position. And owing to the downward flaring form of the oil receptacle, the oil therein, if the receptacle is not too full, will have its top surface below the top opening of the wick tube 10 in any ordinary tilting of the casing and receptacle, to prevent outward passage or spilling of the oil. This form of the oil receptacle also lowers the center of gravity of the lamp filled with oil, so that the lamp will right itself upon tilting, irrespective of the weight, which may be omitted. The spherical form of the casing will cause the same, if tilted, to immediately and automatically resume upright position. And in order further to prevent spilling of the oil, a cap 10 is provided for the wick tube, said cap being pivoted to the side of the wick tube at 11, and having a weighted extension 12, whereby when the lamp is tilted the cap will be automatically engaged with the top of the wick tube to close the same and extinguish the light.

I claim:

In a portable lamp, a hollow spherical casing having a flattened bottom and a top opening, a frusto-conical oil receptacle located in said casing and having a large base in contact marginally with the inner wall of said casing and located adjacent to and spaced apart from the bottom of the casing, and a contracted top fitting in the top opening of the casing, said receptacle having side walls inclined inwardly and upwardly throughout and spaced from the side walls of the casing by an annular interval of the form of a minor segment of a circle in cross-section, and a flat weight located between the bottom of the casing and that of the receptacle.

In testimony whereof I affix my signature in presence of two witnesses.

FRANK DEBROSKY.

Witnesses:
 WOJUECH BEDNAN,
 JOHN J. STADNICKI.

Copies of this patent may be obtained for five cents each, by addressing the "Commissioner of Patents, Washington, D. C."